United States Patent [19]

Kohn

[11] Patent Number: 4,746,475
[45] Date of Patent: May 24, 1988

[54] ULTRATHIN CELLULOSE ESTER POLYMER FILMS AND THEIR PREPARATION

[75] Inventor: Rachel S. Kohn, Springfield, N.J.

[73] Assignee: Hoechst Celanese Corporation, Somerville, N.J.

[21] Appl. No.: 917,982

[22] Filed: Oct. 10, 1986

[51] Int. Cl.⁴ .............................................. B29C 41/12
[52] U.S. Cl. ................................... 264/41; 55/16; 210/500.32; 264/298; 264/331.11; 264/331.21; 428/220; 106/190
[58] Field of Search .................. 428/220; 264/298, 41, 264/331.11, 331.21; 106/190

[56] References Cited

U.S. PATENT DOCUMENTS

| | | | |
|---|---|---|---|
| 3,551,244 | 12/1970 | Forester et al. | 264/298 |
| 4,155,793 | 5/1979 | Salemme et al. | 264/298 |
| 4,279,855 | 7/1981 | Wand, III | 264/298 |
| 4,556,530 | 12/1985 | van der Scheer et al. | 264/298 |

*Primary Examiner*—Allan Lieberman
*Attorney, Agent, or Firm*—Lynch, Cox, Gilman & Mahan

[57] ABSTRACT

Disclosed herein are pinhole-free, ultrathin, free-standing cellulose ester films having thicknesses of 400 angstroms or less and a process to prepare them. The films find particular utility in separatory applications.

13 Claims, No Drawings

ULTRATHIN CELLULOSE ESTER POLYMER FILMS AND THEIR PREPARATION

STATEMENT AS TO RIGHTS TO INVENTIONS MADE UNDER FEDERALLY SPONSORED RESEARCH AND DEVELOPMENT

This invention was made with Government support under Contract Number DAAK 20-84-C-0147 awarded by the Department of Defense (DOD). The Government has certain rights in this invention.

BACKGROUND OF INVENTION

1. Field of Invention

This invention relates to polymer films. More particularly, this invention relates to ultrathin, cellulose ester polymer films and their production.

2. Prior Art

The preparation of films from cellulosic polymers on a liquid support, such as water, is known. For example, in U.S. Pat. No. 2,760,233, a process for preparing curved cellulose ester sheets is disclosed. However, no specific solvent mixtures and ratios suitable for casting ultrathin, pinhole-free, cellulose ester films are disclosed nor are any film thicknesses given.

U.S. Pat. No. 3,445,321 discloses a process for producing hole-free, permselective films with thicknesses between 0.25 and 10 mils. Films are cast on a liquid surface, such as mercury. Suitable polymeric materials from which films can be prepared include cellulosic esters. However, the films of this patent are not ultrathin.

In U.S. Pat. No. 3,933,561, a process for preparing polymeric films on water is disclosed. The film thicknesses are usually less than about 2.5 microns (i.e., 25,000 angstroms) and thicknesses of 0.1 micron (i.e., 1,000 angstroms) are reportedly achieved. Polysaccharides, including cellulosic polymers, are reportedly suitable for the patent's process. However, specific solvent mixtures and ratios suitable for casting ultrathin, pinhole-free, cellulose ester films having thicknesses of 400 angstroms or less are not disclosed.

U.S. Pat. No. 3,551,244 discloses a process for preparing on a water surface films having thicknesses between 0.05 and 5.0 microns (i.e. between 500 and 50,000 angstroms). The patent lists polysaccharide derivatives, such as cellulose acetate, as suitable polymers. However, specific solvent mixtures and ratios suitable for casting ultrathin, pinhole-free, cellulose ester films having thicknesses of 400 angstroms or less are not disclosed.

U.S. Pat. Nos. 4,155,793, 4,272,855 and 3,374,891 disclose processes for preparing substantially void-free, ultrathin, permeable polymeric membranes having thicknesses of 500 angstroms or less. The patents assert that organic and inorganic polymers are suitable for use therein. However, only films prepared from organopolysiloxane-polycarbonate interpolymers mixed with polyphenylene oxide are disclosed in the examples. Cellulose ester films are not disclosed nor are suitable solvent mixtures and ratios for casting ultrathin, pinhole-free, cellulose ester films disclosed.

U.S. Pat. No. 2,689,187 discloses ultrathin nitrocellulose films. However, it does not disclose any organic cellulose ester films or suitable solvent ratios and mixtures for casting pinhole-free, ultrathin, cellulose ester films.

Other patents, such as U.S. Pat. Nos. 2,631,334, and 4,393,113, also disclose ultrathin polymeric films. However, no cellulose ester films are disclosed.

In the prior art, the preparation of ultrathin, pinhole-free, cellulose ester, free-standing films with thicknesses of less than 400 angstroms generally has not been disclosed. Usually, such polymer films with thicknesses of less than 400 angstroms that are cast contain holes or other macroscopic defects.

Therefore, it is an object of this invention to prepare ultrathin, cellulose ester polymer films It is a further object of this invention to prepare pinhole-free, cellulose ester polymeric films.

It is also an object of this invention to prepare free-standing, cellulose ester films having thicknesses of 400 angstroms or less.

These and other objects are obtained by the products and process of the present invention.

SUMMARY OF INVENTION

The present invention is pinhole-free, ultrathin, cellulose ester films having thicknesses of about 400 angstroms or less. The films are prepared by dissolving a cellulose ester polymer in a suitable mixture of 1,2,3-trichloropropane, methylene chloride and methanol to form a polymeric solution, casting the solution on water to form a free-standing film and removing the film from the water. The ultrathin films of the present invention can be used is separatory applications and as drug release membranes to facilitate the controlled release of drugs.

DETAILED DESCRIPTION OF INVENTION

The preparation of cellulose esters such as cellulose acetate, cellulose triacetate, cellulose propionate, cellulose butyrate, cellulose acetate butyrate, and cellulose acetate propionate, is well known. Cellulose esters can be prepared in a variety of ways, such as esterification of cellulose with acids, anhydrides or acid chlorides. The preferred process is the esterification of cellulose with anhydrides in the presence of a mineral acid catalyst, such as sulfuric acid.

Suitable processes for making cellulose esters are disclosed in "Cellulose Esters, Organic," in *Encyclopedia of Polymer Science and Technology*, volume 3, Interscience Publishers, a division of John Wiley and Sons, Inc., New York, 1965, pp. 332–344, and U.S. Pat. Nos. 2,026,583, 2,582,049, 2,539,586, 2,740,776, 2,259,462, 2,824,098, 2,339,631, and 2,607,771 which are incorporated herein by reference.

A typical process for the preparation of cellulose esters involves mixing cellulose and an appropriate acyl acid in a container until the cellulose has become swollen with the acid. For example, if cellulose acetate is the desired product, acetic acid is the appropriate acid. When the acid is absorbed in the cellulose, it permits the sulfuric acid catalyst to be uniformly and rapidly absorbed throughout the cellulose.

After the cellulose has become swollen, a small portion of the sulfuric acid catalyst is added to begin the break down of the cellulose before esterification is started. The mixture is cooled and then a cooled excess of the anhydride corresponding to the acyl acid is added. For example, if cellulose butyrate is the desired product, butyric acid is added as described above, and the corresponding anhydride is butyric anhydride.

Since higher acyl anhydrides react more slowly with the hydroxyl groups of the cellulose, it is preferred to speed up the esterification reaction by employing a higher concentration of anhydride and lowering the amount of acid present than when lower acyl acids, such as acetic acid, are employed. After the anhydride is added, the mixture is then cooled and the remainder of the sulfuric acid is added. Since acetylation is an exothermic reaction, it is usually necessary to regulate the reaction temperature. For example, when cellulose acetate or triacetate is prepared, the temperature should be regulated so that it increases to between 90° and 95° F. during an interval of 1.5 to 2 hours. One means of controlling the temperature is by adding a precooled anhydride.

As the esterification nears completion, the reaction solution becomes clear and the reaction temperature is relatively constant until the desired viscosity is obtained. At this point, the triester of cellulose has been formed.

To halt the esterification reaction and to begin hydrolysis, water in the form of aqueous acid is added to destroy the excess anhydride. For example 60–75 percent acetic acid in water is added when cellulose acetate is prepared. When the desired acetyl content is reached, a suitable amount of magnesium oxide or magnesium carbonate is added to neutralize the sulfuric acid catalyst. The cellulose ester is then precipitated, washed free of acid, and dried.

If the cellulose triester is desired, a suitable amount of magnesium oxide or magnesium carbonate is added along with the water to neutralize the sulfuric acid. The resulting solution is held at an elevated temperature until substantially all the sulfuric acid is neutralized.

It is also possible to prepare mixed esters, such as cellulose acetate butyrate and cellulose acetate propionate. They are prepared by the same general process as that used for cellulose acetate except that the higher acyl anhydrides or higher acyl acids are added with acetic anhydride or with glacial acetic acid in the esterification mixture to produce a uniform product containing both acyl groups. The preparation of cellulose acetate butyrate and cellulose acetate propionate is described in more detail in U.S. Pat. Nos. 2,339,631 and 2,824,098.

In the preparation of ultrathin films, any cellulose ester capable of being dissolved in a mixture containing 1,2,3-trichloropropane, methylene chloride, and methanol can be employed. The preferred cellulose esters are cellulose acetate, cellulose triacetate, cellulose butyrate, cellulose propionate, cellulose acetate butyrate and cellulose acetate propionate. The most preferred ester is cellulose triacetate. The solvents used to form the casting solution are 1,2,3-trichloropropane, methylene chloride and methanol and are generally present at about a 85:52:13 to about a 100:45:5 ratio by volume and preferably about a 91:50:9 ratio. All three solvents must be present in the casting solution. If methanol is not present, the polymer solution has a tendency to gel before casting. Methylene chloride is employed so that the polymer solution will spread on the surface of water. The ratio of solvents given above should not be substantially varied. The reason is that if either the amount of methylene chloride or trichloropropane is reduced significantly, the casting solution will not spread on the surface of water.

The polymer is dissolved in the solvent mixture at a concentration of about two to about twelve percent, preferably about three to about seven percent and most preferably about four to about five percent based upon the total weight of solvents and polymer. Generally, the greater the amount of the polymer in the casting solution, the thicker the films that are prepared. Conversely, the lower the amount of polymer, the thinner the films will be. However, if the amount of polymer is too low, such as below about one percent by weight, it is very difficult to lift the films from the casting surface. The polymer is preferably dissolved by magnetically stirring the polymer and solvents for several hours (e.g. three to five hours) at room temperature.

Cellulose ester films may also be prepared from a mixed polymer solution containing a cellulose ester polymer and a minor amount of other polymers which are compatible in film form with the cellulose ester and which are capable of being dissolved in the casting solution. When other polymers are mixed with a cellulose ester, the amount of cellulose ester employed should be 80 percent or more by weight based upon the total weight of polymers dissolved in the polymeric solution.

Before the polymeric solution is cast into films, it is preferred to filter the solution using microfilters and/or membranes. Filtration of the polymer solution before casting substantially reduces imperfections in the cast films. For example, the solution can be suction filtered through glass microfiber filters and then passed through one or more Millipore membranes available from the Millipore Corporation. It is preferred to filter the solution through a 0.45 micron Millipore membrane. In order to force the solution through the membrane, it is usually necessary to apply pressure. For example, a Millipore stainless 47 mm pressure holder operated at a pressure up to 100 psi argon can be employed. The amount of pressure applied will depend upon the viscosity of the solution and the pore size of the membrane. Enough pressure to force the solution through the membrane is needed.

After filtration, the solution is cast on water at or near room temperature. As used herein, the term "water" includes aqueous solutions containing minor amounts (e.g., one percent or less by weight of the solution) of organic solvents (e.g., lower weight alcohols) the presence of which does not adversely affect the properties of the films cast on the solution. The addition of such organic solvents may facilitate the removal of the film from the water's surface. The water is contained in any suitable walled container. For example, an appropriate container is an aluminum container having dimensions of 12"×12"×3". Preferably, the walls of the container are sloped outwardly at about a 20 degree incline to reduce reflected surface waves which can damage the film. Such waves are produced when the polymeric solution is placed on the water's surface or by air currents and external vibrations. Most preferably, the inside walls of the container are teflon coated so that films are less likely to stick to the sides of the container.

The polymeric solution is cast by depositing a drop of the polymer solution upon the water's surface. The solution usually spreads over the surface of the water in three seconds or less. The solution is allowed to stand until a sufficient amount of the solvent has evaporated to form a free-standing film. As used herein, the term "free-standing film" refers to a film that has a physically stable shape and is dimensionally stable on its casting surface and can be removed from the casting surface without having to be supported over the entire surface area of the film. The time of evaporation generally is between 20 and 30 seconds and rarely more than 60 seconds.

After the solvent has evaporated, the film is lifted from the liquid surface using any suitable means, such as a 2"×3", thin, aluminum plate having a 30 millimeter diameter hole in it and a handle on one end of the plate. When the aluminum plate touches the surface of the film, the film adheres to the aluminum plate and may readily be removed from the surface of the water.

The films of the instant invention are generally round, ultrathin, pinhole-free, uniform films and have a diameter of about six inches or more and a thickness of less than 400 angstroms, preferably about 160 angstroms or less and most preferably about 70 to about 160 angstroms. As used herein, the term "ultrathin film" refers to a film having a thickness of about 400 angstroms or less, and the term "pinhole-free film" refers to a film containing no holes more than one micron in diameter.

The films of this invention can be used as gas separation membranes and in end uses where a controlled release of drugs is needed.

The invention is illustrated by the following examples in which all percentages are by weight unless otherwise specified.

EXAMPLE 1

A polymer solution containing 4.7 percent by weight cellulose triacetate in a mixture of 91:50:9 by volume 1,2,3-trichloropropane:methylene chloride:methanol was prepared by dissolving the polymer in the solvent mixture. The cellulose triacetate polymer was KB-175 which is available from Celanese Corporation. KB-175 is a solvent castable, film grade, cellulose triacetate flake containing no chemical additives and has a viscosity at 6 percent weight/volume of 147±15 centipose, an acetyl value of 61.3±0.3 percent, a melting point of 287° C. and a molecular weight, $M_w$, of about 90,000. The solution was prepared by magnetically stirring the solvents and the polymer at room temperature for about 5 hours.

After the polymer was dissolved in the solvent mixture, the polymer solution was filtered through a Duropore polyvinylidene fluoride membrane having a pore size of about 0.45 micron and available from the Millipore Corporation. A Millipore stainless 47 millimeter pressure holder operated at a pressure sufficient to force the solution through the membrane was employed.

After filtration, a drop of the polymer solution was deposited on water. The water was contained in a square aluminum container measuring 12"×12"×3", having Teflon coated walls which were sloped away from the center at a 20 degree incline. The drop spread rapidly over the surface of the water to form a film having a diameter of about six inches. After 20 seconds, the film was lifted from the surface of the water using a 2"×3" aluminum plate having a 30 mm diameter hole in the middle and a handle attached at one end. The film was uniform and had a thickness of about 160 angstroms. Microscopic examination of the film disclosed no pinholes having a diameter of 1 micron or more.

EXAMPLE 2

Example 1 was repeated except that a 91:50 ratio of 1,2,3-trichloropropane to methylene chloride was employed. The casting solution gelled and could not be cast.

EXAMPLE 3

Example 1 was repeated except that a 91:9 ratio of 1,2,3-trichloropropane to methanol was prepared. When a droplet of the casting solution was placed on water, the droplet would not spread to form a film.

EXAMPLE 4

Example 1 was repeated except that the amount of cellulose triacetate was about 5.0 percent by weight. The resulting film had a thickness of about 160 angstroms and had no microscopically observable holes having a diameter greater than one micron.

EXAMPLE 5

Example 1 was repeated except that a three percent by weight solution of cellulose triacetate was prepared and the solution was not filtered. The resulting film contained spots, had a thickness of about 85 angstroms and exhibited no macroscopic pinholes.

EXAMPLE 6

Example 1 was repeated except that the polymer solution contained three percent by weight of the cellulose triacetate polymer in a 91:25:25:9 by volume solvent mixture of 1,2,3-trichloropropane:methylene chloride:ethylene chloride:methanol. When a droplet of the casting solution was placed on water, the droplet would not spread to form a film.

As can be seen, 1,2,3-trichloropropane, methylene chloride and methanol must all be present in order to prepare pinhole-free, ultrathin, cellulose ester films.

What is claimed is:

1. A process for preparing a cellulose ester polymer film having a thickness of about 400 angstroms or less and containing no holes more than about one micron in diameter, wherein the process comprises:
   (a) preparing a casting solution containing a cellulose ester polymer at about the two to about the twelve percent by weight level, based upon the total weight of the casting solution, in about a 85:52:13 to about a 100:45:5 by volume ratio of 1,2,3-trichloropropane:methylene chloride:methanol;
   (b) depositing the casting solution on water to form a free-standing film; and
   (c) removing the film from the water.

2. A process for preparing a cellulose triacetate polymer film having a thickness of about 400 angstroms or less and containing no holes more than about one micron in diameter, wherein the process comprises:
   (a) preparing a casting solution containing a cellulose triacetate polymer at about the two to about the twelve percent by weight level, based upon the total weight of the casting solution, in about a 85:52:13 to about a 100:45:5 by volume ratio by 1,2,3-trichloropropane:methylene chloride:methanol;
   (b) depositing the casting solution on water to form a free-standing film; and
   (c) removing the film from the water.

3. The process of claim 1 wherein the cellulose ester is cellulose acetate, cellulose triacetate, cellulose butyrate, cellulose propionate, cellulose acetate butyrate or cellulose acetate propionate.

4. The process of claim 1 wherein the cellulose ester is cellulose triacetate.

5. The process of claims 1, 2, or 3 wherein the cellulose polymer is present at about the three to about the seven percent by weight level in the casting solution based upon the total weight of the casting solution.

6. The process of claim 5 wherein the polymer is present at about the four to about the five percent by weight level.

7. The process of claims 1, 2 or 3 wherein the casting solution contains about a 91:50:9 by volume ratio of 1,2,3-trichloropropane:methylene chloride:methanol.

8. The process of claim 5 wherein the casting solution contains about a 91:50:9 by volume ratio of 1,2,3-trichloropropane:methylene chloride:methanol.

9. A process for preparing a cellulose triacetate polymer film having a thickness of about 400 angstroms or less and containing no holes more than about one micron in diameter, wherein the process comprises:
 (a) preparing a casting solution containing a cellulose triacetate polymer present at about the three to about the seven percent by weight level, based upon the total weight of the casting solution, in about a 91:50:9 by volume ratio of 1,2,3-trichloropropane:methylene chloride:methanol;
 (b) depositing the casting solution on water to form a free-standing film; and
 (c) removing the film from the water.

10. The process of claim 9 wherein the cellulose triacetate polymer is present at about the four to about the five percent by weight level.

11. The process of claims 1, 2, 3 or 9 wherein the casting solution contains a cellulose ester polymer at about the 80 to about the 100 percent by weight level and another polymer or polymers at about the 20 to about the 0 percent by weight level based upon the total weight of the polymers dissolved in the casting solution.

12. The process of claim 6 wherein the casting solution contains about a 91:50:9 by volume ratio of 1,2,3-trichloropropane:methylene chloride:methanol.

13. The process of claim 6 wherein the casting solution contains a cellulose ester polymer at about the 80 to about the 100 percent by weight level and another polymer or polymers at about the 20 to about the 0 percent by weight level based upon the total weight of the polymers dissolved in the casting solution.

* * * * *